United States Patent [19]

Smith et al.

[11] Patent Number: 4,509,547
[45] Date of Patent: Apr. 9, 1985

[54] CONTROL SYSTEM FOR AN ELECTRO-PNEUMATIC CONVERTER

[75] Inventors: Jane E. Smith, Mentor; Rowland E. Whitford, Painesville, both of Ohio

[73] Assignee: The Babcock & Wilcox Company, New Orleans, La.

[21] Appl. No.: 468,105

[22] Filed: Feb. 22, 1983

[51] Int. Cl.³ ............................................. G05D 16/00
[52] U.S. Cl. ................................... 137/85; 137/487.5
[58] Field of Search ...................... 137/82, 85, 487.5; 251/131

[56] References Cited

U.S. PATENT DOCUMENTS 2,863,287 12/1958 Berkman ..................... 137/487.5 X
2,949,273 8/1960 Roper ............................. 251/131 X
3,113,582 12/1963 Hudson ....................... 137/487.5 X
3,315,250 4/1967 Higgins ............................ 137/82 X

OTHER PUBLICATIONS

PCT Application WO/80/01826; Jacobsson; Published 9/1980.

Primary Examiner—Alan Cohan
Attorney, Agent, or Firm—Vytas R. Matas; Robert J. Edwards

[57] ABSTRACT

An electro-pneumatic control system (10) is provided having closed loop control of a D.C. motor (12) which is operated from a biased motor servo circuit (14) thereby eliminating the need for a negative power supply to provide bi-directional rotation. Closed loop control is provided by a feedback signal from a pressure transducer (26) monitoring the pressure output signal (22) of the mechanical servo assembly (20).

10 Claims, 3 Drawing Figures

4,509,547

CONTROL SYSTEM FOR AN ELECTRO-PNEUMATIC CONVERTER

TECHNICAL FIELD

The present invention relates to control systems in general and particularly to control systems for electro-pneumatic converters utilizing a power supply having two positive voltage sources with reference to common.

BACKGROUND ART

Electro-pneumatic converters are known wherein a 4 to 20 milliamp electrical signal is used to actuate a solenoid-like motor. The 4 to 20 milliamp electrical signal causes a proportionate displacement in the core of the solenoid-like motor which displacement is used to control an associated valve producing a pressure change proportional to the motion of the core. An example of such a device may be found in U.S. Pat. No. 3,334,642 issued Aug. 8, 1967 to P. G. Borthwick.

There are certain disadvantages to such known electro-pneumatic control systems. Firstly, they are unable to hold positions on loss of power. Should power be removed from the coil, the core moves back to a position where it is in equilibrium. This causes the pneumatic output signal to go off scale, resulting in the movement of control devices to the fully-opened or fully-closed position which may be catastrophic in certain control systems. Secondly, such known electro-pneumatic converters are vibration sensitive. Since the cores are suspended from springs which act as range and zero limiters, vibration of the core causes a variation in the pneumatic output signal.

SUMMARY OF THE INVENTION

The present invention overcomes these problems of known electro-pneumatic converters as well as others by providing an electro-pneumatic converter which is dependent upon a D.C. motor to provide a variable restriction to a pneumatic nozzle, thereby providing a fail-safe device which will maintain the last desired signal to the pneumatic assembly upon a loss of electrical power and which is insensitive to vibration.

The electro-pneumatic converter of the present invention utilizes a D.C. motor which is driven by a 4 to 20 milliamp input signal to provide a variable restriction to a pneumatic backpressure device by way of a cam thus allowing the pneumatic device to produce a 3 to 15 psi output signal corresponding to the 4 to 20 milliamp input signal.

The D.C. motor rotation is provided by an error signal between a set point signal determined by the 4 to 20 milliamp electrical input and a feedback signal of the corresponding 3 to 15 psi pneumatic output as sensed by a pressure transducer. The power supply operating the error producing signal is biased up to a reference voltage around which the error signal is referenced to thereby provide bi-directional D.C. motor rotation in response to positive voltage signals referenced below or above this reference voltage.

Thus, one object of the present invention is to provide an electro-pneumatic control system which will maintain the last pneumatic output upon a loss of electric power.

Another object of the present invention is to provide an electro-pneumatic control system which is insensitive to vibration of the electric motive means.

Yet another object of the present invention is to provide a control system for an electro-pneumatic converter which has a biased power supply being able to provide bi-directional motor rotation without using a positive and negative voltage.

Yet still another object of the present invention is to operate an electro-pneumatic converter from a two-wire process control loop (4 to 20 milliamp) without a power supply of its own.

These and other objects of the present invention will be more clearly understood from a review of the following detailed description of the invention when considered with the accompanying drawings.

DESCRIPTION OF THE PREFERRED EMBODIMENT

Figure 1:
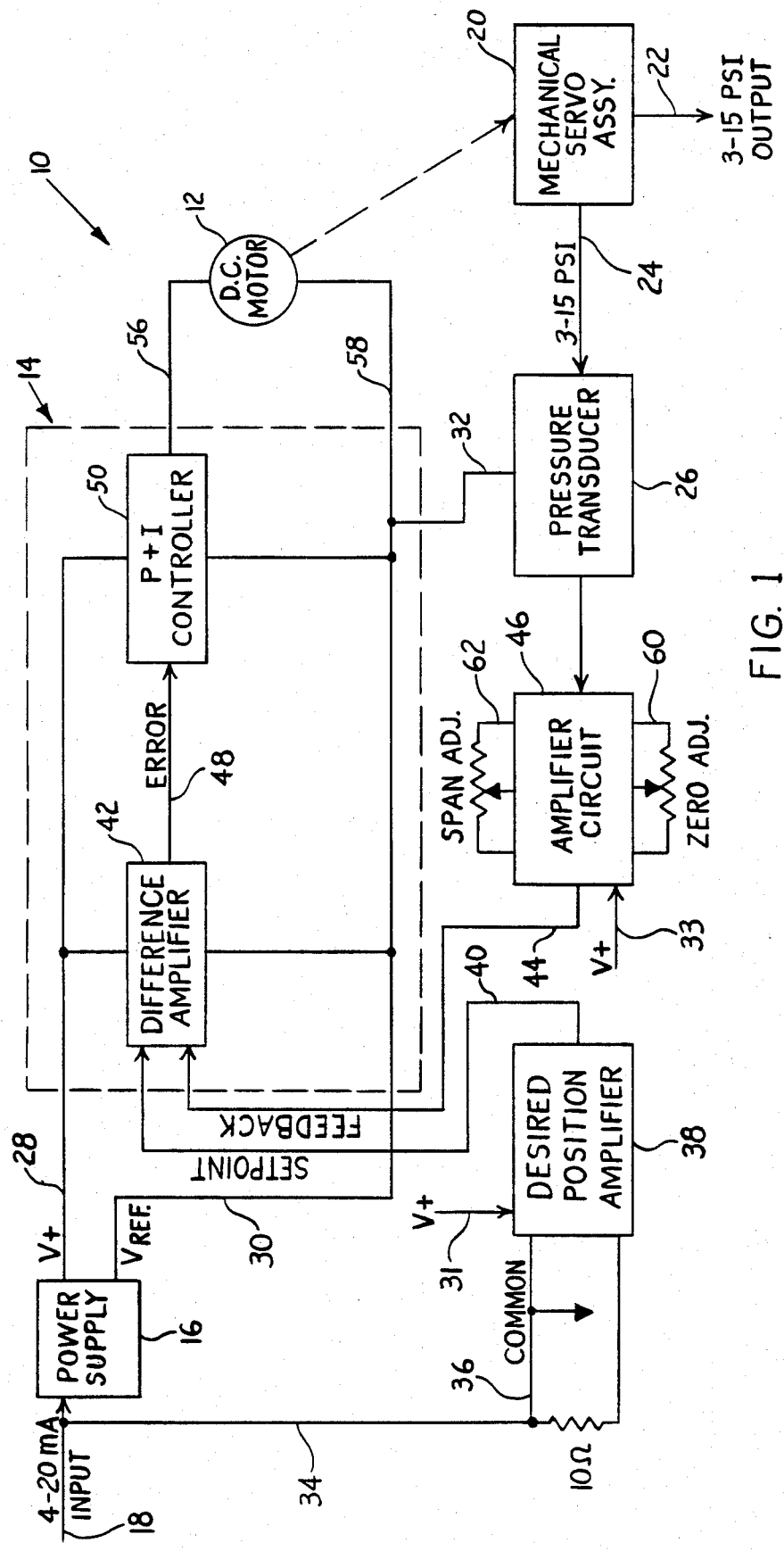
FIG. 1 is a functional block diagram of the control system of the present invention.
Figure 1A:
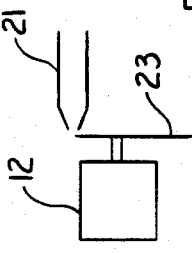
FIG. 1a is an expanded view of the motor-driven cam and backpressure nozzle of the mechanical servo assembly of FIG. 1.

Referring now to the drawings wherein the showings are made for purposes of illustrating the preferred embodiment of the present invention and are not intended to limit the invention thereto FIGS. 1 and 1a shown an electro-pneumatic control system 10 wherein a D.C. motor 12 is controlled by a motor servo circuit 14 which is powered by a power supply 16 operated from a 4 to 20 milliamp input control signal connected to the power supply 16 along line 18. The D.C. motor 12 is mechanically constrained to a mechanical servo assembly 20 which has a backpressure nozzle 21 variably restricted by a cam 23 driven by the D.C. motor 12 to thus provide a variable backpressure output along line 22 normally in the 3 to 15 psi output range. This 3 to 15 psi output is linear and corresponds to the linear 4 to 20 milliamp electrical input provided along input line 18. This same 3 to 15 psi output is also sent along line 24 to a pressure transducer 26 which provides a feedback signal used in determining control of the D.C. motor 12 as will be described more fully later.

To allow the D.C. motor 12 to be operated bidirectionally without the need for dual polarity voltages, the power supply 16 establishes dual voltages V+ and $V_{ref}$ along power lines 28 and 30 respectively. The V+ voltage is in the range of 6.4 volts nominal and powers the motor servo circuit 14 as well as a desired position amplifier 38 and an amplifier circuit 46 along input lines 31 and 33 respectively. The $V_{ref}$ portion of power supply 16 is transmitted along line 30 to bias up the motor servo circuitry 14 and power the pressure transducer 26 along line 32.

To establish the set point from the 4 to 20 milliamp input signal to which the appropriate 3 to 15 psi output will have to be supplied from output line 22, the particular electrical input signal is sent along line 34 to a 10 ohm precision resistor located between the circuit common at line 36 and the input to a position amplifier 38. The precision 10 ohm resistor senses the particular current level and establishes a voltage drop across itself with that voltage drop providing the counterpart voltage input to the position amplifier 38. The position amplifier 38 raises the input signal level to a predetermined level and sends this along line 40 as a set point signal to a difference amplifier 42 compatible with the level of the feedback signal also provided to the difference amplifier 42. The difference amplifier 42 is the first stage of the motor servo circuit 14. The second input to the difference amplifier 42 is the feedback signal provided along line 44 from amplifier circuit 46 which scales and zeroes the pressure signal provided by pressure transducer 26 which acts as the pneumatic-to-electric converter for the 3 to 15 psi output signal established at output line 22.

The difference amplifier 42 senses any deviation of the feedback signal from line 44 to the established set point signal 40 and establishes an error signal along line 48 which is an amplified difference signal so long as such difference between set point and feedback is maintained. This amplified error signal is inputed into a proportional and integral controller 50 where it is integrated and scaled up or down with respect to $V_{ref}$.

Figure 2:
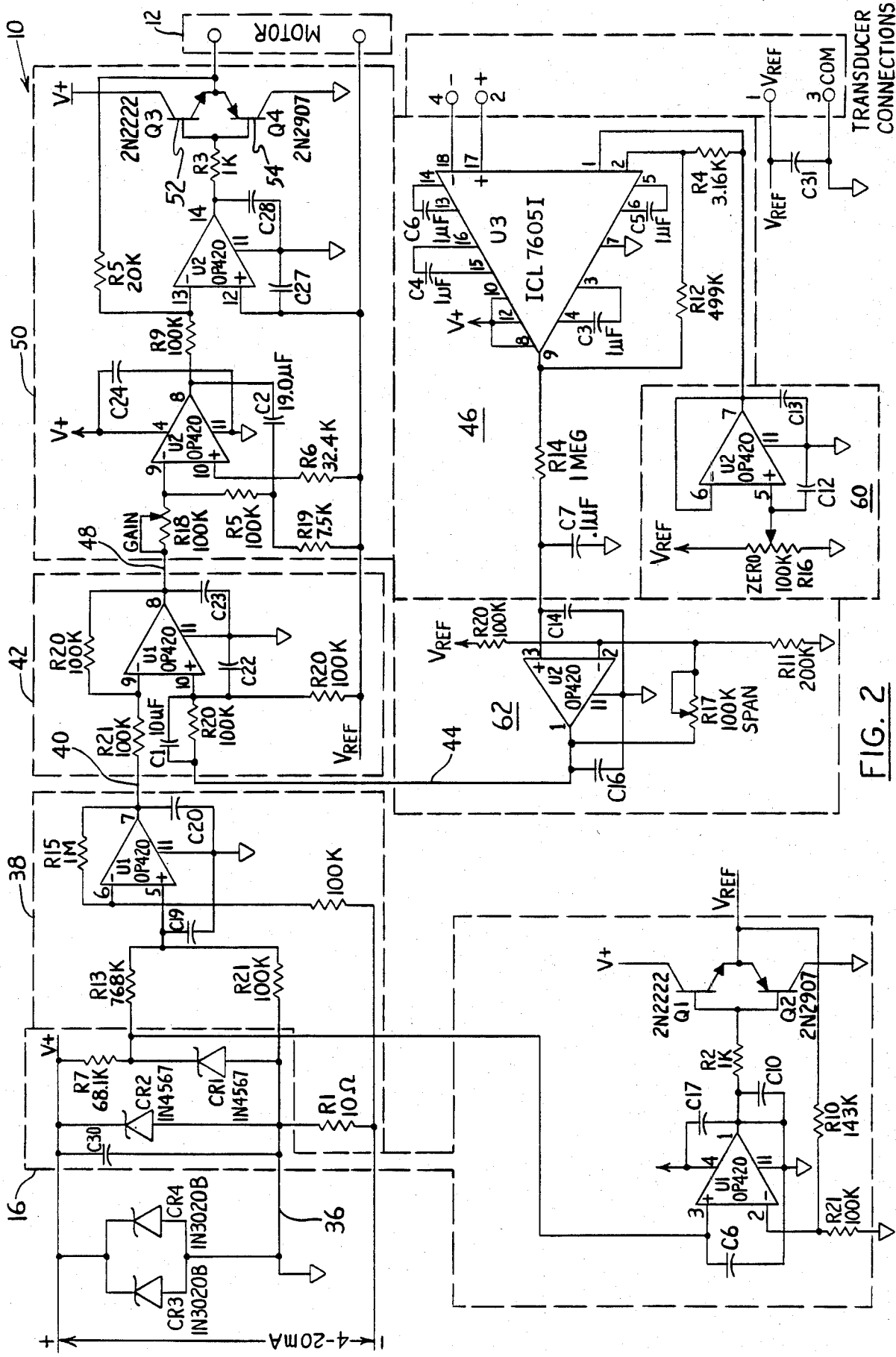
FIG. 2 is a schematic electrical circuit of the FIG. 1 functional block diagram.

As may be best seen with particular reference to FIG. 2, the proportional plus integral controller 50 has a pair of driver transistors 52 and 54 in complimentary-symmetry configuration which are respectively NPN and PNP thereby allowing either sourcing or sinking of the current signal to the motor 12 along line 56. The positive terminal of the motor 12 is thus connected to the line 56 while its negative terminal is connected along line 58 to the voltage reference $V_{ref}$ at line 30.

Thus bi-directional rotation of the motor 12 is achieved by the voltage output of the proportional plus integral controller 50 rising or falling below the voltage reference $V_{ref}$. When the output signal is above voltage reference $V_{ref}$, the NPN transistor 52 of the proportional plus integral controller circuit sources current. This current through the motor 12 will dictate the speed response of the motor 12 with critical damping due to the integral action of the controller 50. As the voltage differential decreases, the current draw and the speed of the motor also decreases. When the voltage output of the proportional plus integral controller 50 is equal to $V_{ref}$, no current flow through the motor. If the output voltage drops below $V_{ref}$, the direction of the motor's rotation will reverse due to the voltage level applied to it crossing the $V_{ref}$ point. This crossing of the voltage level causes the PNP transistor 54 of the proportional plus integral controller circuit 50 to sink current.

Turning back now with particular reference to FIG. 1, the amplifier circuit 46 has both a zero adjustment 60 and a span adjustment 62. The zero and span adjustments allows the feedback signal to be adjusted to respond over a variety of ranges. The predominant pressure range and pressure starting or zero point that the feedback will be adjusted for is the 3 to 15 psi signal which is the standard for pneumatic instrumentation as 4 to 20 milliamp is the standard for electrical instrumentation. Other ranges are also available and may be set, including any 50 percent split range desired (i.e., 0 percent is 3 psi, 100 percent is 9 psi).

As will thus be seen, should an electrical failure occur in the system, the D.C. motor 12 would stop. However, the cam 23 that it drives would remain in its last position providing the same backpressure restriction from the nozzle 21 to the mechanical servo assembly 20 and the last conforming pressure output signal would be maintained along output line 22. Also, since the motor servo circuit 14 is biased up by the voltage reference $V_{ref}$ the need for a negative power supply to provide bi-directional rotation of the motor 12 is obviated.

Certain modifications and improvements will occur to those skilled in the art upon reading this specification. It will be understood that all such modifications and improvements have been deleted herein for the sake of conciseness and readability but are properly included within the scope of the following claims.

We claim:

1. A closed-loop electro-pneumatic control system comprising:
   a mechanical servo assembly for providing a variable pneumatic output in response to a movable variable restriction;
   motor means for moving said variable restriction of said mechanical servo assembly to vary the pneumatic output therefrom;
   means for actuating said motor means in response to a control signal;
   means for establishing a set point signal in response to an electrical input signal indicative of a desired pneumatic output signal;
   means for establishing a feedback signal indicative of an actual pneumatic output signal;
   combining means for comparing said set point signal with said feedback signal to establish a control signal to said actuating means; and
   said motor actuating means and said combining means are powered by a pair of positive voltage sources established by a dual power supply to provide bi-directional rotation of said motor means without a negative power supply.

2. A control system as set forth in claim 1 wherein said feedback establishing means includes a pressure transmitter connected to said mechanical servo assembly to measure the pneumatic output therefrom and establish an electrical signal representative thereof.

3. A control system as set forth in claim 2 wherein said feedback establishing means further includes an amplifier circuit having a span and zero adjustment to allow the pneumatic output from said mechanical servo assembly to be scaled to a desired range of output pressures from a desired starting pressure.

4. A control system as set forth in claim 3 wherein said combining means includes a difference amplifier having a first input from said set point establishing means and a second input from said amplifier circuit to determine any error difference between these two inputs and to amplify the error signal to a value capable of driving said motor actuating means.

5. A control system as set forth in claim 4 wherein said difference amplifier of said combining means establishes an amplified error signal with respect to the positive voltage reference source.

6. A control system as set forth in claim 5 wherein said motor actuating means includes an NPN transistor series connected to a PNP transistor to allow respective sourcing and sinking of current to said motor means depending on the error signal from said difference amplifier being above or below the voltage reference source to thereby provide bi-directional rotation to said motor means.

7. A control system as set forth in claim 6 wherein said motor means is a D.C. motor having its positive terminal connected to the output of the PNP transistor of said motor actuating means and its negative terminal connected to the voltage reference source.

8. A control system as set forth in claim 7 wherein said set point establishing means includes a precision resistor connected to said electric input signal to establish a voltage thereacross depending upon the value of said electric input signal and connected to a desired position amplifier for amplifying this signal to a level usable by said difference amplifier of said combining means.

9. A control system as set forth in claim 1 wherein said motor means is a D.C. motor having a cam connected thereto for variably restricting said mechanical servo assembly depending upon the position of said cam.

10. A control system as set forth in claim 8 wherein said motor means is a D.C. motor having a cam connected thereto for variable restricting said mechanical servo assembly depending upon the position of said cam.

* * * * *